(No Model.)

F. F. LANDIS.
CENTRIFUGAL GRAIN SEPARATOR.

No. 551,498. Patented Dec. 17, 1895.

Witnesses
Arthur S. Brown
James M. Shea

Inventor
Frank F. Landis
By Attorney Herbert W. Jenner

UNITED STATES PATENT OFFICE.

FRANK F. LANDIS, OF WAYNESBOROUGH, PENNSYLVANIA.

CENTRIFUGAL GRAIN-SEPARATOR.

SPECIFICATION forming part of Letters Patent No. 551,498, dated December 17, 1895.

Application filed August 21, 1895. Serial No. 560,015. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Centrifugal Grain-Separators; and I do hereby declare the following to be a full, clear, and exact description of the invention, such as will enable others skilled in the art to which it appertains to make and use the same.

This invention relates to centrifugal grain-separators; and it consists in the novel construction and combination of the parts hereinafter fully described and claimed.

Figure 1:
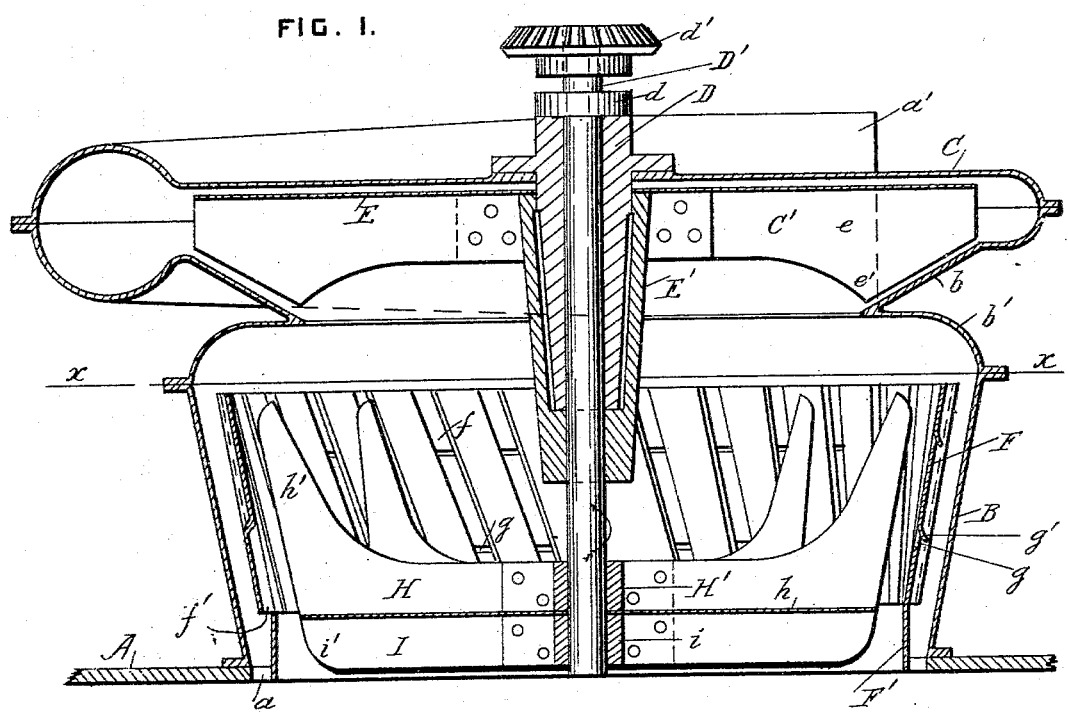
Figure 2:
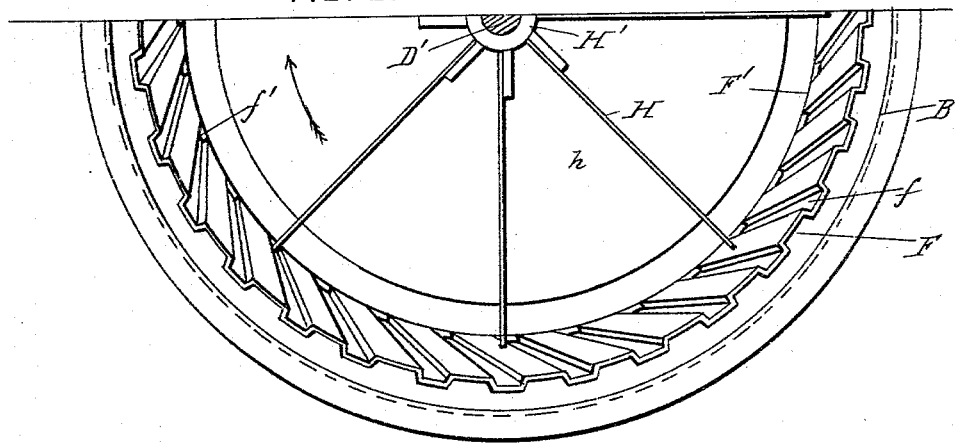

In the drawings, Figure 1 is a vertical section of a centrifugal grain-separator constructed according to this invention. Fig. 2 is a partial plan view of the same, taken in section on the line $x\ x$ in Fig. 1.

A is a base-plate provided with an inlet-opening $a$. B is a circular inclosing case, preferably conical in form and secured to the base-plate around the said opening.

C is the casing of the discharger C'. This casing C is secured to the top or the case B, and is preferably provided with a conical throat-piece $b$, and a concave portion $b'$, formed integral with it and connecting it to the top of the case B. The casing C is also provided with a delivery-pipe $a'$.

D is a bearing secured to the casing C and depending centrally within it.

D' is a shaft journaled in the bearing D. This shaft is provided with a collar $d$ resting on the top of the bearing, and means for revolving it, such as the wheel or pulley $d'$.

The discharger C' is provided with radial arms $e$, preferably having projections $e'$, which run in the throat-piece $b$.

E is a disk above the arms $e$. The arms and disk are secured to a long hub E', which is fastened to the shaft D' below the bearing D. This hub encircles the bearing, and is journaled on the upper part of it.

F is a circular separating-chamber supported in the case B. This chamber is preferably conical and larger at the top. F' is a cylindrical mouthpiece at the bottom of the chamber F. The chamber F is provided with grooves or corrugations $f$ in its sides, and these grooves are preferably inclined or arranged spirally with respect to the vertical axis of the chamber. These grooves or corrugations have openings $f'$ at their bottoms and openings $g$ having outwardly-projecting lips $g'$ at points in their length on the periphery of the chamber.

H are radial arms secured to a hub H', which is fastened on the lower end of the shaft D', and $h$ is a disk under the arms H. The arms H preferably have extensions $h'$ on their upper sides, and their outer edges are substantially parallel with the periphery of the separating-chamber.

I are narrow radial arms secured to a hub $i$, which is fastened to the shaft D' below the disk $h$. The arms I are arranged in the cylindrical mouthpiece F' and their lower corners $i'$ are preferably rounded.

The grain is thrashed in a thrashing-machine of any approved construction and most of the grains leave the straw at the thrashing devices. The straw, which still has grains mixed with it, is conducted to the under side of the separating-chamber, and is caught by the arms I and flung to the periphery of the mouthpiece F'. A strong current of air is drawn through the separating-chamber by the discharger, and the straw is drawn upward in the separating-chamber. The arms H whirl around the straw in the separating-chamber in a loose annular stream, and the grains are driven out of the straw by centrifugal force. The grooves $f$ are inclined upwardly in a direction opposite to the direction of the motion of the arms H, and the grains which strike the sides of the grooves are forced downward by the inclination of the grooves and by gravity. The grains pass through the openings $f'$ and $g$ and fall through the opening $a$ in the base-plate. The straw is drawn upward in the separating-chamber F by the discharger, and the conical form of the chamber assists its upward progress and loosens it. The straw is turned over by the concave portion $b'$ before it passes into the discharger-casing, so that any grains still mixed with it may drop out. The straw is then whirled around in the discharger-casing by the discharger, and is flung up the delivery-pipe.

What I claim is—

1. The combination, with a vertical grain separating chamber having substantially upright grooves in its periphery and lateral openings for the passage of grains, of means for whirling around the straw in the said chamber, substantially as set forth.

2. The combination, with a vertical grain separating chamber having spirally-arranged substantially upright grooves in its periphery and lateral openings for the passage of grains, of means for whirling around the straw in the said chamber, substantially as set forth.

3. The combination, with a grain separating chamber conical in form and larger at its upper end, said chamber being provided with substantially upright grooves in its periphery and having openings $f'$ and $g$ at the bottoms and at the lower ends of the grooves for the passage of grains; of means for whirling around the straw in the said chamber, substantially as set forth.

4. The combination, with a grain separating chamber provided with substantially upright grooves in its periphery, and a mouth-piece below the said grooves having openings $f'$ and $g$; of revoluble arms for whirling around the straw in the said mouth-piece and in the said chamber, and a horizontal disk secured to the said arms at the entrance to the said chamber, substantially as set forth.

5. The combination, with a grain separating chamber provided with substantially upright grooves in its periphery, and an inclosing case; of a concave portion secured to the top of the case and extending over the periphery of the said chamber, a discharger casing above the said concave portion, a shaft journaled centrally of the said chamber, a discharger secured on the said shaft in the said casing, and arms secured on the said shaft below the discharger and operating to whirl around the straw in the said chamber, substantially as set forth.

In testimony whereof I affix my signature in presence of two witnesses.

FRANK F. LANDIS.

Witnesses:
 T. S. CUNNINGHAM,
 M. F. NEWMAN.